P. J. R. POSTEL-VINAY.
METAL FITTING FOR CONNECTING TOGETHER CERTAIN STRUCTURAL MEMBERS OF AN AEROPLANE.
APPLICATION FILED DEC. 19, 1918.
1,340,626. Patented May 18, 1920.
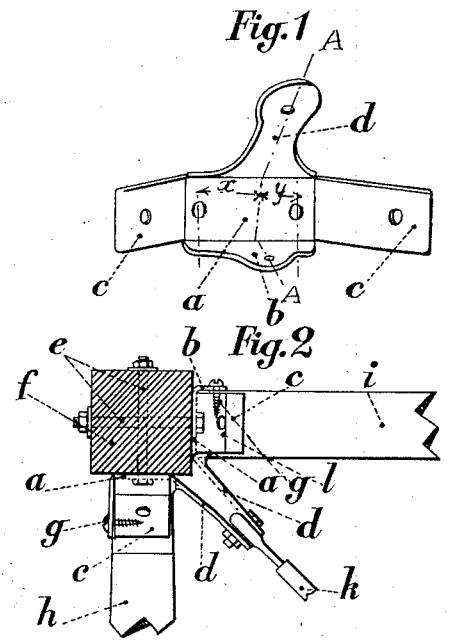
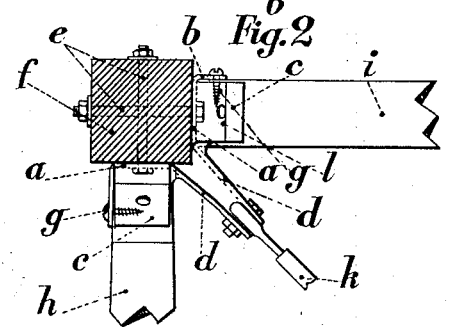
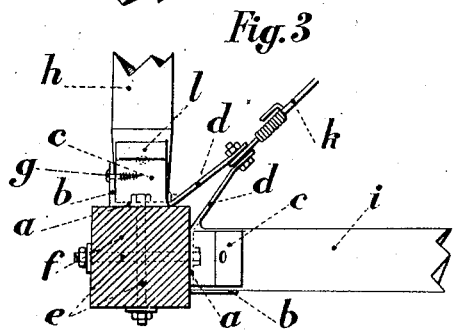
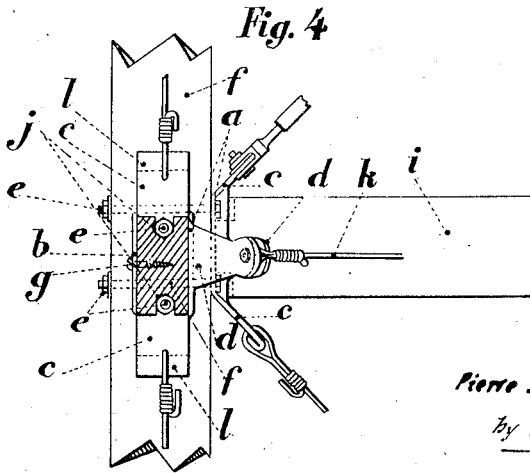

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, FRANCE.

METAL FITTING FOR CONNECTING TOGETHER CERTAIN STRUCTURAL MEMBERS OF AN AEROPLANE.

1,340,626.     Specification of Letters Patent.     Patented May 18, 1920.

Application filed December 19, 1918. Serial No. 267,548.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Metal Fittings for Connecting Together Certain Structural Members of an Aeroplane, of which the following is a specification.

This invention has for its object to provide an improved metal fitting for connecting together longitudinals, uprights and cross members of an aeroplane, and for the attachment of stay wires thereto.

This improved metal fitting is essentially composed of a metal plate cut out and folded in such a manner as to have two faces for connecting the upright or the cross member to the longitudinal and three lugs for the attachment of the stay wires.

The accompanying drawings illustrate by way of example a constructional form of the invention.

Figure 1 is a perspective view of the improved metal fitting.

Fig. 2 is an elevation partly in section of an upper junction comprising two such metal fittings.

Fig. 3 is a view similar to the preceding figure, showing a lower junction.

Fig. 4 is a plan partly in section corresponding to Fig. 3, showing all the stay wires.

As shown the improved metal fitting is cut and folded in such a way as to have two main faces $a$ and $b$ at right angles to each other and three lugs $c$, $c$, $d$ for the attachment of the stay wires; these lugs may have any desired inclination.

The face $a$ is fixed by bolts $e$ to the longitudinal $f$; and the face $b$ is attached by a screw $g$ to the upright $h$ or to the cross member $i$. In order to prevent any slipping, the upright and the cross member are each formed at their bases as shown at $j$ (Fig. 4) with notches in which the heads of the bolts $e$ of the longitudinal are fitted.

The lugs $c$, $c$, $d$ have holes for the attachment of the stay wires $k$. Figs. 2, 3 and 4 show the manner in which two lugs $d$ of two improved metal fittings may be joined together for the attachment of a stay wire $k$. These lugs may have edges folded over on themselves as shown at $l$ (Figs. 2, 3, 4) in order to give greater strength to the attachment.

The improved fittings are interchangeable by reason of the mode of folding that is adopted.

As shown in Fig. 1 the two holes of the main face $a$ through which the bolts $e$ pass are placed at different distances $x$ and $y$ from the transverse axis A—A passing through the center of the hole of the central lug $d$, in such a manner that when the two metal fittings are assembled in position and connected by a bolt or the like passing through the holes of the central lugs $d$, the holes of the main face $a$ of one of the metal fittings are not in alinement with the holes of the corresponding face of the other metal fitting. It is thus possible to fix the metal fitting on to the longitudinal by means of bolts passing entirely through the longitudinal. This mode of assembling would not be practicable if the holes were placed at equal distance from the axis A—A as, in this case, the bolts would meet inside the longitudinal. The distances $x$ and $y$ may be 16 and 11 m/m respectively, but these distances can of course be selected to suit the diameter of the bolts $e$ employed.

Having now described my invention, what I claim as new and desire to secure by Letters Patent is:

A metal fitting for aeroplanes for effecting the connection of a longitudinal beam with an upright or a cross member and the attachment of stay wires thereto, comprising a metal plate cut out and folded in such a manner as to have a main face, a lateral face perpendicular to the main face, a central lug and two end lugs, the said three lugs having holes for the attachment of the stay wires, the main face which is adapted to lie between the longitudinal and the end of the cross member or other element, having holes which are at different distances from the axis passing through the hole of the central lug, in such a manner that when the central lugs of two neighboring fittings are assembled in position and connected by a member passing through the holes in said lugs the holes of the main faces do not coincide, thus allowing the metal fittings to be secured to the longitudinal by means of bolts passing completely through the longitudinal.

In testimony whereof I have signed my name to this specification.

PIERRE JEAN RENÉ POSTEL-VINAY.